US012800059B2

(12) United States Patent
Oh

(10) Patent No.: US 12,800,059 B2
(45) Date of Patent: Nov. 17, 2026

(54) LOCKING DEVICE FOR LEVER OF GAS VALVE

(71) Applicant: Kofulso Co., Ltd., Incheon-si (KR)

(72) Inventor: Seung-il Oh, Seoul (KR)

(73) Assignee: Kofulso Co., Ltd., Incheon-si (KR)

( * ) Notice: Subject to any disclaimer, the term of this patent is extended or adjusted under 35 U.S.C. 154(b) by 43 days.

(21) Appl. No.: 19/041,029

(22) Filed: Jan. 30, 2025

(65) Prior Publication Data

US 2026/0185631 A1 Jul. 2, 2026

(30) Foreign Application Priority Data

Dec. 30, 2024 (KR) ........................ 10-2024-0200902

(51) Int. Cl.
*F16K 35/02* (2006.01)

(52) U.S. Cl.
CPC .................................. *F16K 35/025* (2013.01)

(58) Field of Classification Search
CPC ........ F16K 35/025; F16K 35/10; F16K 35/02; F16K 35/00; Y10T 137/7256
USPC ............................................ 137/385; 251/99
See application file for complete search history.

(56) References Cited

U.S. PATENT DOCUMENTS 3,943,959 A 3/1976 Kirkland
4,478,617 A 10/1984 Rees
5,181,539 A 1/1993 Yokoyama
5,183,073 A * 2/1993 Roberts .................. F16K 35/06 251/105
5,188,335 A * 2/1993 Pettinaroli .............. F16K 35/06 137/550
5,361,801 A 11/1994 Kerpan et al.
5,365,759 A * 11/1994 Bonomi .................. F16K 35/10 70/180
5,467,796 A 11/1995 Pettinaroli et al.
5,579,804 A * 12/1996 Roberts .................. F16K 35/06 70/180
5,709,112 A * 1/1998 Kennedy ............... F16K 35/025 70/180
6,148,851 A * 11/2000 Friedline ................ F16K 35/06 251/105
6,789,782 B2 9/2004 Giacomini
9,103,450 B2 8/2015 Street et al.
9,810,338 B2 11/2017 Carter

* cited by examiner

*Primary Examiner* — Jessica Cahill
(74) *Attorney, Agent, or Firm* — Dunlap Bennett & Ludwig PLLC

(57) ABSTRACT

A locking device for a lever of a gas valve, the gas valve including a valve body, an operating part, a first locking protrusion, the lever having a rotating portion, a standing portion and a grasping portion bent sequentially from the rotating portion, and first and second locking bent portions, wherein the locking device includes: a locking member consisting of a guide portion for guiding the standing portion, a bottom portion extending downward from the bottom of the guide portion, a locking groove for inserting a second locking protrusion, and a side portion locked onto the second locking protrusion; and a spring member fitted to the standing portion to push the guide portion toward the rotating portion.

5 Claims, 6 Drawing Sheets

LOCKING DEVICE FOR LEVER OF GAS VALVE

CROSS REFERENCE TO RELATED APPLICATION OF THE DISCLOSURE

The present application claims the benefit of Korean Patent Application No.10-2024-0200902 filed in the Korean Intellectual Property Office on December 30,2024, the entire contents of which are incorporated herein by reference.

FIELD OF THE DISCLOSURE

The present disclosure relates to a locking device for a lever of a gas valve that is capable of having a locking member simply configured, without any change in the structure of the gas valve, so that unless the locking member is released, the lever cannot operate to open or close the gas valve, thereby ensuring high safety in the use of the gas valve.

BACKGROUND OF THE RELATED ART

Generally, gases are used as energy for operating gas ranges for cooking food in restaurants or houses or for operating heating boilers.

A gas valve is mounted on a pipe to which gas is supplied, and the gas valve operates with a lever extending to one side thereof in such a way as to be easily held and turned by a user.

If the lever is pulled unexpectedly by a person passing by the gas valve, such as clothes, a bag strap, and the like or by a child who does not recognize the risk of a gas explosion accident, the gas valve is unintendedly opened to cause an unexpected accident.

As a result, the present inventor has presented a locking device for a lever of a gas valve wherein a locking member is applied to the lever so that only when the locking member is released, the lever operates.

Further, the present inventor has put many efforts to keep the gas valve and the lever as existing in commercial products.

SUMMARY OF THE DISCLOSURE

Accordingly, the present disclosure has been made in view of the above-mentioned problems occurring in the related art, and it is an object of the present disclosure to provide a locking device for a lever of a gas valve that is capable of having a locking member simply configured, without any change in the structure of the gas valve, so that unless the locking member is released, the lever cannot operate to open or close the gas valve, thereby ensuring high safety in the use of the gas valve.

To accomplish the above-mentioned objects, according to the present disclosure, there is provided a locking device for a lever of a gas valve, the gas valve including a valve body, an operating part protruding from the central portion of the valve body, a first locking protrusion protruding outward from the operating part, the lever having a rotating portion on one side thereof in such a way as to be mounted on top of the operating part to open and close the gas valve, a standing portion and a grasping portion bent sequentially from the rotating portion, and first and second locking bent portions bent downward from the rotating portion in such a way as to be locked onto the first locking protrusion at positions for opening and closing the gas valve, the locking device including: a locking member consisting of a guide portion for inserting the standing portion in such a way as to move the standing portion upward and downward, a bottom portion extending downward from the bottom of the guide portion, a locking groove formed in the middle portion of the underside of the bottom portion in such a way as to insert a second locking protrusion protruding outward from the operating part on the opposite side to the first locking protrusion at the position where the gas valve is closed, and a side portion bent upward from one side of the bottom portion in such a way as to be locked onto the second locking protrusion at the position where the gas valve is open; and a spring member fitted to the standing portion in such a way as to push the guide portion toward the rotating portion.

BRIEF DESCRIPTION OF THE DRAWINGS

The above and other objects, features and advantages of the present disclosure will be apparent from the following detailed description of the preferred embodiments of the disclosure in conjunction with the accompanying drawings, in which.

DETAILED DESCRIPTION OF THE PREFERRED EMBODIMENTS

Hereinafter, embodiments of the present disclosure will be explained in detail with reference to the attached drawings.

FIGS. 1 to 5 show a locking device for a lever of a gas valve according to a first embodiment of the present disclosure.

Figure 1:
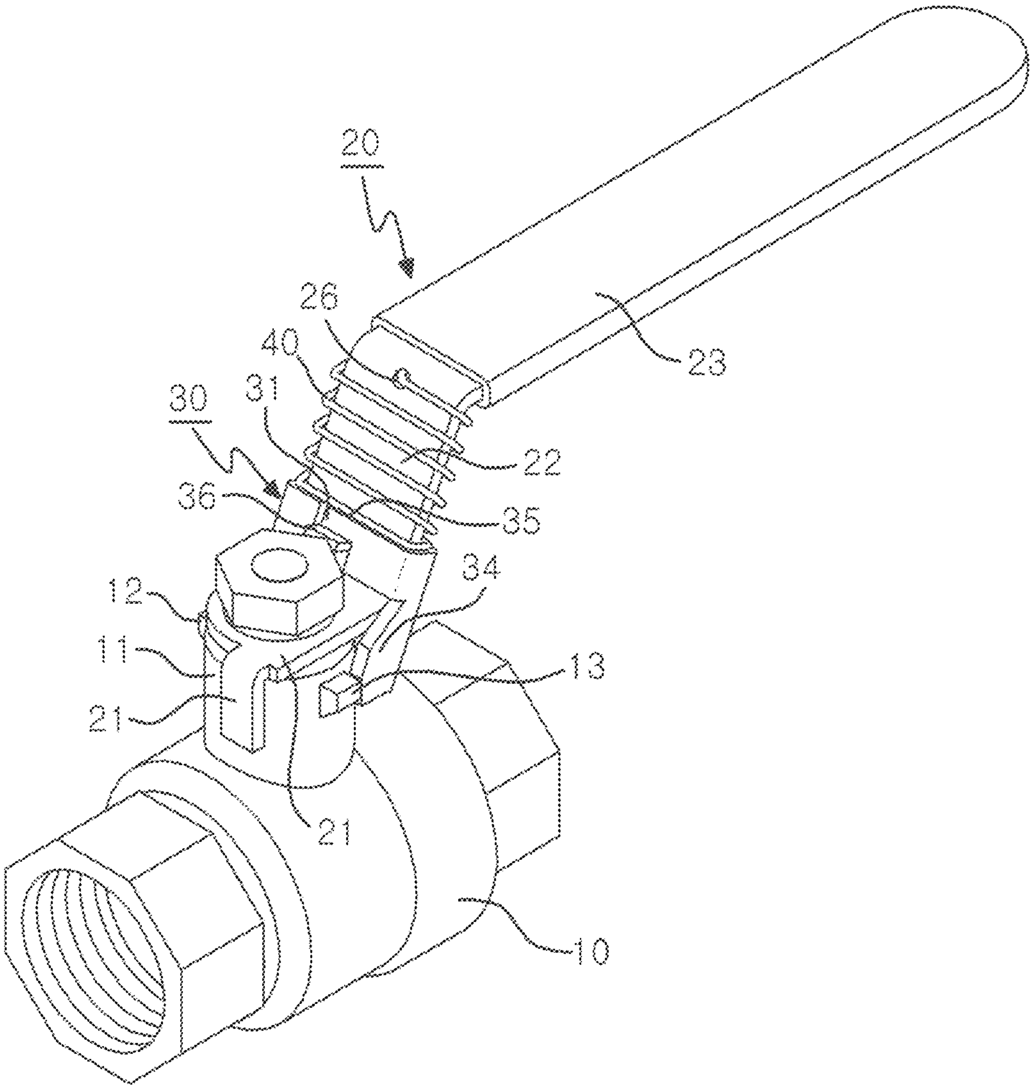
FIG. 1 is a perspective view showing a locking device for a lever of a gas valve according to a first embodiment of the present disclosure.
Figure 2:
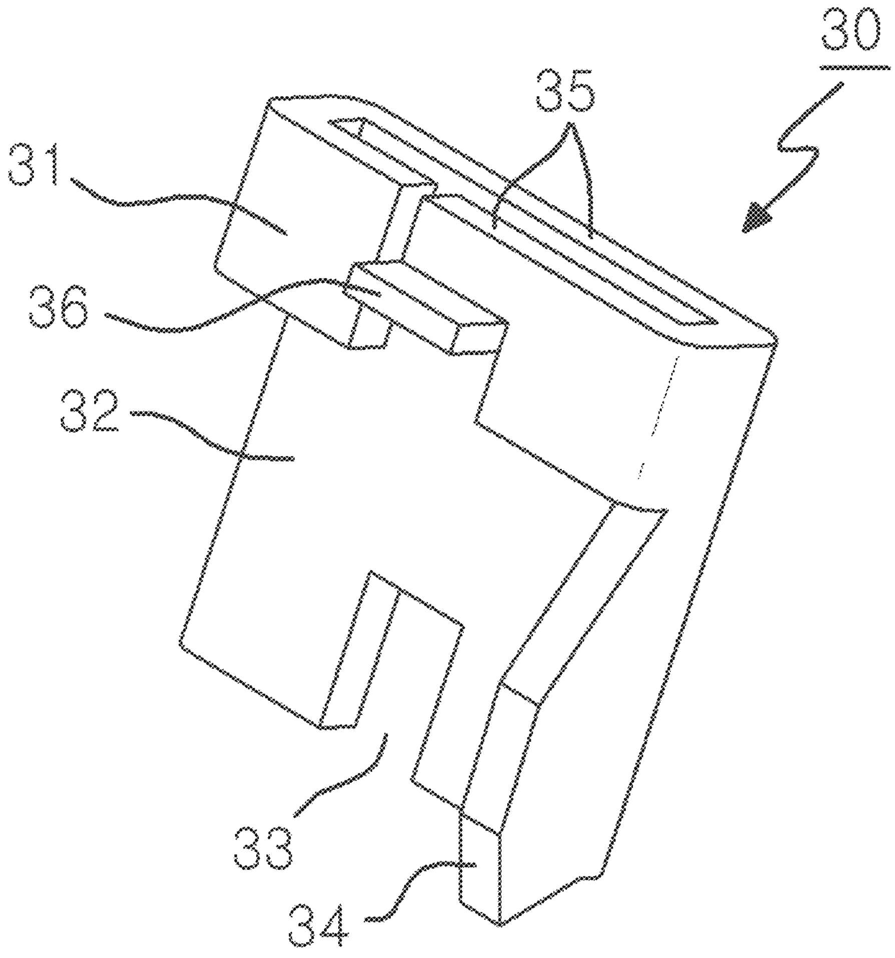
FIG. 2 is a perspective enlarged view showing a locking member of the locking device according to the first embodiment of the present disclosure.

As shown in FIGS. 1 and 2, there is provided a locking device for a lever of a gas valve according to a first embodiment of the present disclosure, the gas valve including a valve body 10, an operating part 11 protruding from the central portion of the valve body 10, a first locking protrusion 12 protruding outward from the operating part 11, the lever 20 having a rotating portion 21 at one end thereof in such a way as to be mounted on top of the operating part 11 to open and close the gas valve, a standing portion 22 and a grasping portion 23 bent sequentially from the rotating portion 21, and first and second locking bent portions 24 and 25 bent downward from the rotating portion 21 in such a way as to be locked onto the first locking protrusion 12 at positions for opening and closing the gas valve, the locking device includes: a locking member 30 consisting of a guide portion 31 for inserting the standing portion 22 in such a way as to move the standing portion 22 upward and downward, a bottom portion 32 extending downward from the bottom of the guide portion 31, a locking groove 33 formed in the middle portion of the underside of the bottom portion 32 in such a way as to insert a second locking protrusion 13 protruding outward from the operating part 11 on the opposite side to the first locking protrusion 12 at the position where the gas valve is closed, and a side portion 34 bent upward from one side of the bottom portion 32 in such a way as to be locked onto the second locking protrusion 13 at the position where the gas valve is open; and a spring member 40 fitted to the standing portion 22 in such a way as to push the guide portion 31 toward the rotating portion 21.

Figure 3:
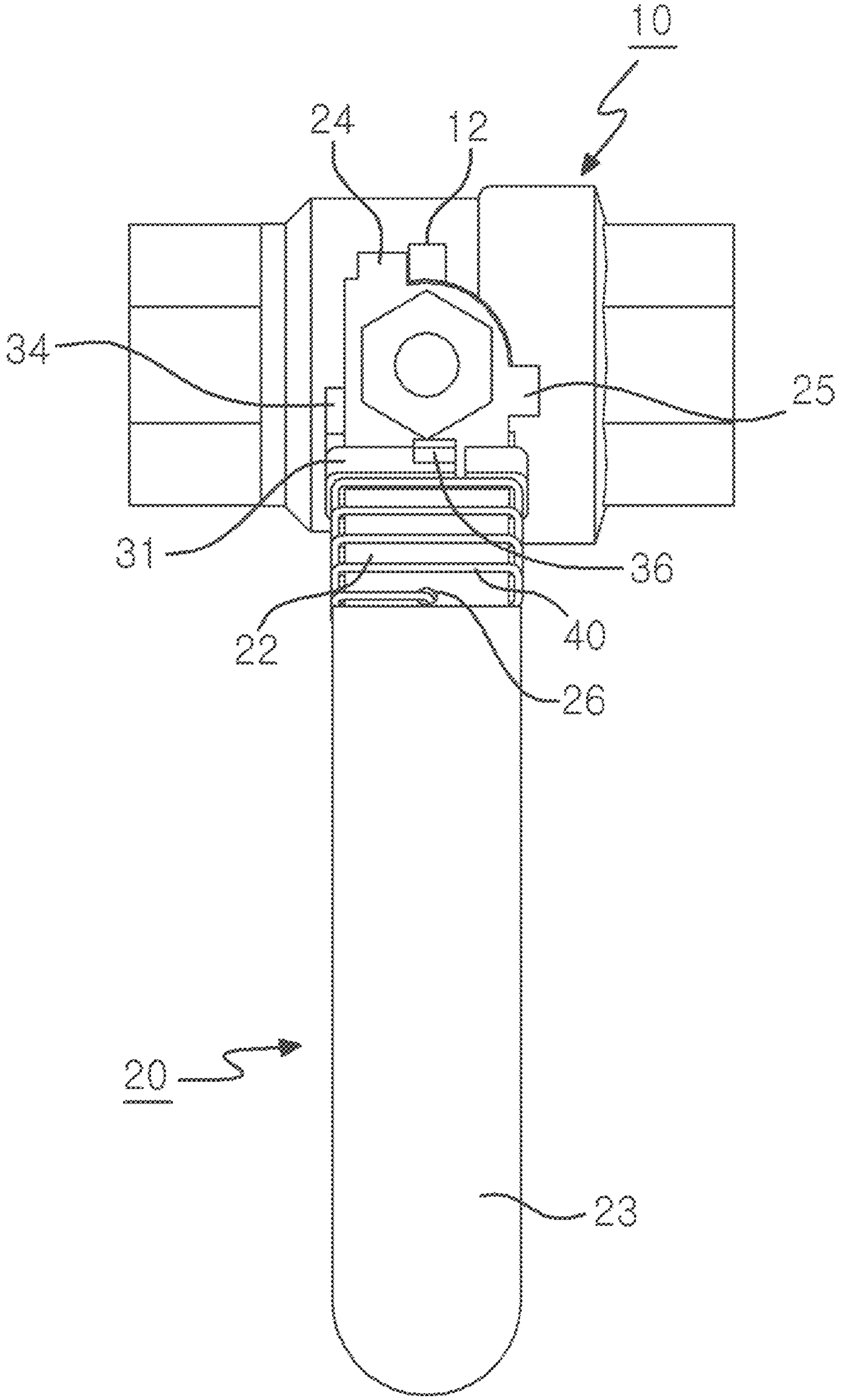
FIG. 3 is a plan view showing a state where the gas valve is closed according to the first embodiment of the present disclosure.
Figure 6:
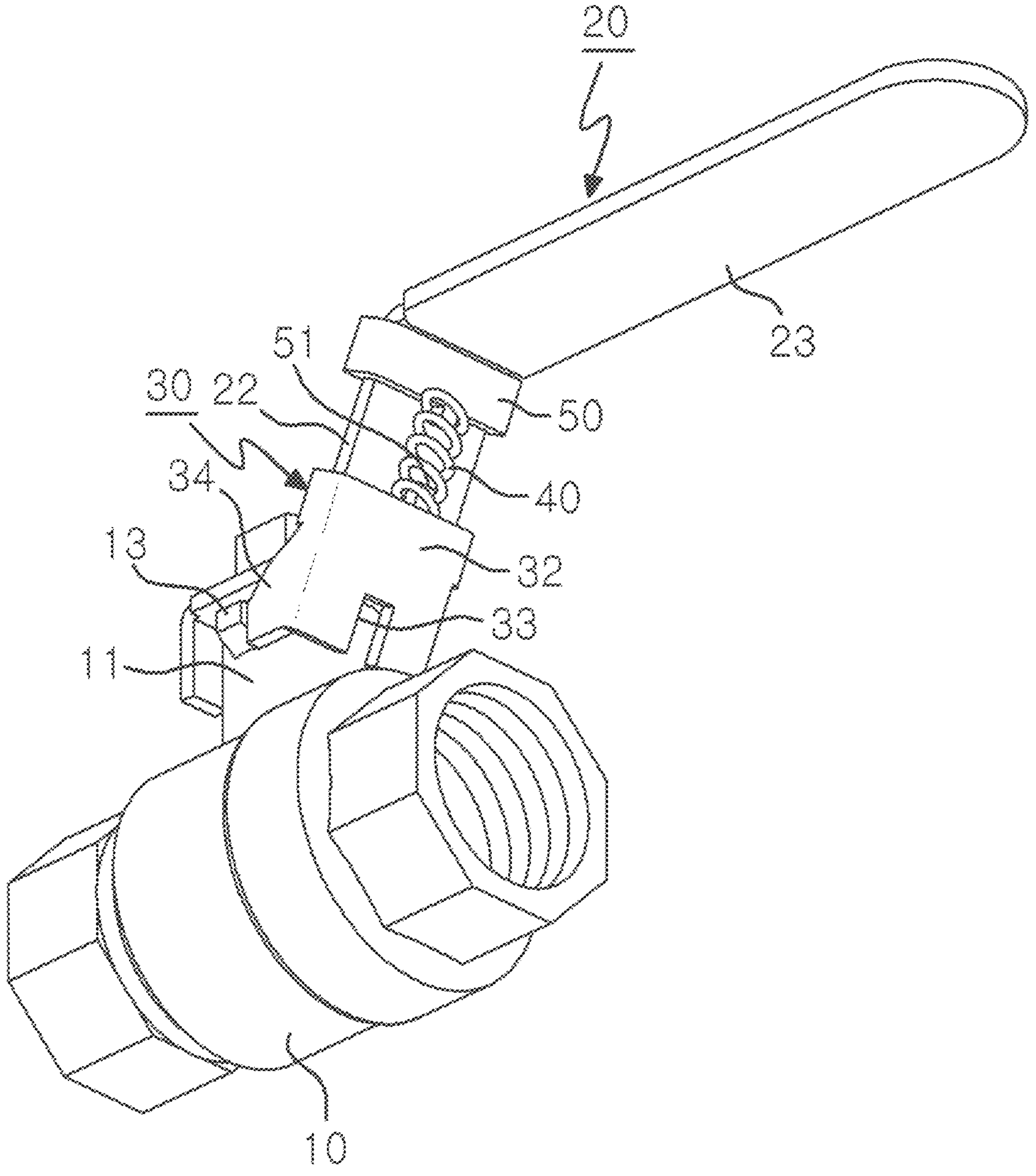
FIG. 6 is a perspective view showing a locking device for a lever of a gas valve according to a second embodiment of the present disclosure.

According to the first embodiment of the present disclosure, the spring member 40 as shown in FIGS. 1 and 3 is made by winding a coil to the shape of a rectangle, unlike a general coil spring (See a spring member 40 as shown in FIG. 6), so that in a state where the spring member 40 surrounds the standing portion 22, one end of the spring member 40 is fixed to the standing portion 22, and the other end is supported against top of the guide portion 31.

Referring to one of methods for fixing the spring member 40 to the standing portion 22, the standing portion 22 has a hole 26 formed thereon, and one end of the spring member 40 is fixedly fitted to the hole 26.

The guide portion 31 is bent to surround the standing portion 22 so that the top of the guide portion 31 serves as support portions 35 for supporting the other end of the spring member 40.

The guide portion 31 has a protrusion 36 protruding outward therefrom in such a way as to be used by a user's finger thereonto when the locking member 30 is pushed up by the user.

FIG. 3 is a plan view showing a state where the gas valve is closed according to the first embodiment of the present disclosure.

As shown in FIG. 3, a state where the gas valve is closed, the first locking bent portion 24 is locked onto the first locking protrusion 12 of the operating part 11 and thus restricts the rotational direction of the lever 20. Further, the second locking protrusion 13 is fitted to the locking groove 33 to allow the rotating portion 21 of the lever 20 to be fixedly located (See a broken line in FIG. 4).

Figure 4:
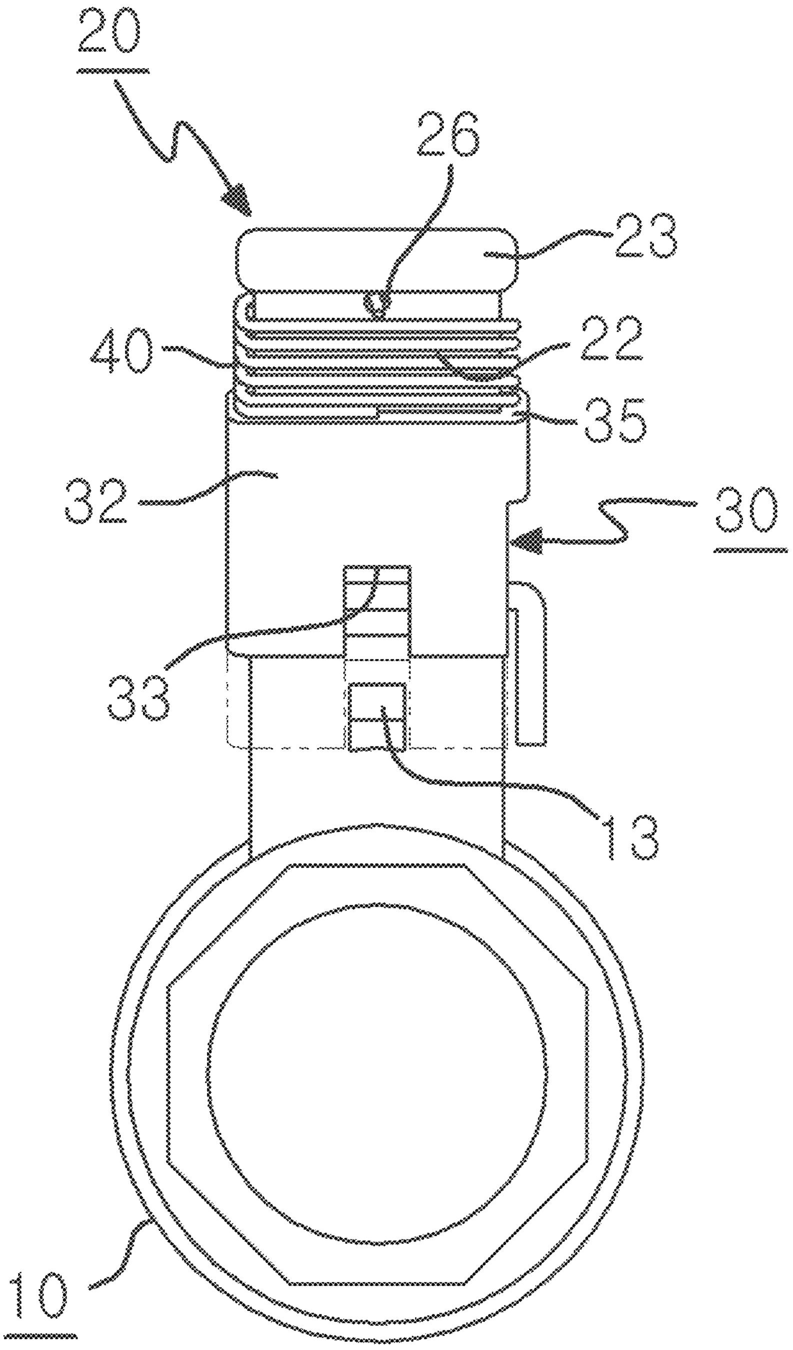
FIG. 4 is an enlarged front view showing a state where the locking member is released according to the first embodiment of the present disclosure.

FIG. 4 is a front view showing a state where the locking member is pushed up to open the gas valve according to the first embodiment of the present disclosure.

If it is desired to turn the lever 20, as shown in FIG. 4, the locking member 30 is pushed up, so that the locking groove 33 is above the second locking protrusion 13 to allow the lever 20 to be released from the locked state. In this case, the spring member 40 becomes compressed.

Figure 5:
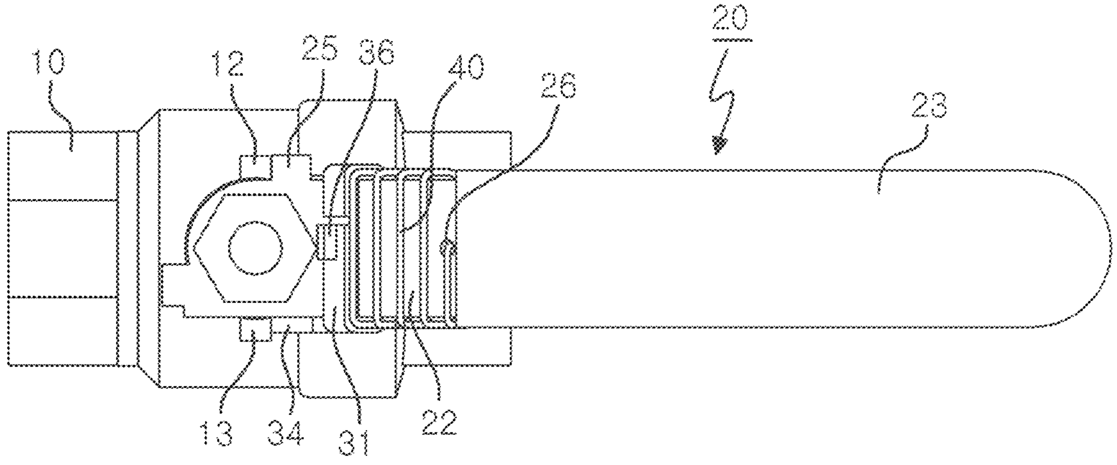
FIG. 5 is a plan view showing a state where the gas valve is open according to the first embodiment of the present disclosure.

FIG. 5 is a plan view showing a state where after the grasping portion 23 is taken by the user to turn the lever 20 to a state as shown in FIG. 4, the external force applied to the locking member 30 is removed to allow the gas valve to be open.

In this case, the second locking bent portion 25 is locked onto the first locking protrusion 12 to restrict the rotational direction of the lever 20. Further, the side portion 34 is locked onto the second locking protrusion 13 to allow the rotating portion of the lever 20 to be fixedly located (See FIGS. 1 and 5).

The side portion 34 moves to the top of the second locking protrusion 13, in a state where the locking member 30 is pushed up to a releasing position, to allow the lever 20 to turn to a locking position, without any interference.

In such states as shown in FIGS. 3 and 5, the spring member 40 serves to push the locking member 30 toward the rotating portion 21 so that the lever 20 cannot be turned unless an artificial force is applied to push up the locking member 30 and thus release the locking member 30 from the locking state, as shown in FIG. 4.

The present inventor has checked that if the spring member 40 is not present, the locking member 30 does not move down from top of the standing portion 22, in the state where the gas valve is open and closed as shown in FIGS. 3 and 5, so that undesirably, the lever 20 is free to turn.

FIG. 6 is a perspective view showing a locking device for a lever of a gas valve according to a second embodiment of the present disclosure.

As shown, the spring member 40 as a coil spring is located between a support member 50 fixed to the upper portion of the standing portion 22 and the guide portion 31, and further, the support member 50 has a shaft 51 adapted to fit within the coil spring 40.

As described above, the locking device for the lever of the gas valve according to the present disclosure is provided with the locking member simply configured, without any change in the structure of the gas valve, so that unless the locking member is released, the lever cannot operate to open or close the gas valve, thereby ensuring high safety in the use of the gas valve.

While the present disclosure has been made with reference to the particular illustrative embodiments, it is not to be restricted by the embodiments but only by the appended claims. It is to be appreciated that those skilled in the art can change or modify the embodiments without departing from the scope and spirit of the present disclosure.

What is claimed is:

1. A locking device for a lever of a gas valve, the gas valve comprising a valve body, an operating part protruding from a central portion of the valve body, a first locking protrusion protruding outward from the operating part, the lever having a rotating portion on one end thereof as to be mounted on top of the operating part to open and close the gas valve, a standing portion and a grasping portion bent sequentially from the rotating portion, and first and second locking bent portions bent downward from the rotating portion to be locked onto the first locking protrusion positions for opening and closing the gas valve, the locking device comprising:

a locking member consisting of a guide portion for guiding the standing portion to move the standing portion upward and downward, a bottom portion extending downward from the a bottom of the guide portion, a locking groove formed in a middle portion of an underside of the bottom portion to insert a second locking protrusion protruding outward from an the operating part on an opposite side to the first locking protrusion in a position where the gas valve is closed, and a side portion bent upward from one side of the bottom portion to be locked onto the second locking protrusion in a position where the gas valve is open; and a spring member fitted to the standing portion to push the guide portion toward the rotating portion.

2. The locking device according to claim 1, wherein the spring member is a coil in the shape of a rectangle where the spring member surrounds the standing portion, one end of the spring member is fixed to the standing portion, and the other end of the spring member is supported against a top of the guide portion.

3. The locking device according to claim 2, wherein the standing portion has a hole formed therein, and the one end of the spring member is fixedly fitted in the hole.

4. The locking device according to claim 1, wherein the spring member is a coil spring located between a support member fixed to an upper portion of the standing portion and the guide portion.

5. The locking device according to claim 4, wherein the support member has a shaft adapted to fit within the coil spring.

* * * * *